United States Patent Office 3,004,014
Patented Oct. 10, 1961

3,004,014
STYRENE POLYMERIZATION
Ralph W. Myerholtz, Jr., Highland, Ind., and Edwin L. De Young, Chicago, Ill., assignors to Standard Oil Company, Chicago, Ill., a corporation of Indiana
No Drawing. Filed Sept. 26, 1958, Ser. No. 763,473
2 Claims. (Cl. 260—93.5)

This invention relates to an improvement in the polymerization of styrene from an aromatic hydrocarbon solution by means of a dispersed alkali metal of small particle size in the presence of a dihydric alcohol dialkyl ether promoter at a controlled temperature and the invention pertains more particularly to an improved technique for controlling and/or modifying molecular weight or intrinsic viscosity of the polymer product.

Heretofore, polystyrenes having an intrinsic viscosity of the order of 1 have been obtainable by sodium polymerization of styrene from an aromatic solvent at a temperature of about 60° C. (U.S. 2,813,089) but it was difficult or impossible to obtain product polymers having intrinsic viscosities of the order of 2 to 3 in a large-scale plant designed to produce a polymer having an intrinsic viscosity of only 1; in other words, it was necessary to materially change the temperature, promotor, catalyst concentration or styrene concentration in order to obtain a product of very different intrinsic viscosity and this, in turn, meant difficulties in reaction control and/or a sacrifice in product yield. The object of this invention is to provide a technique for controlling product molecular weight or intrinsic viscosity which does not require any alteration of polymerization temperature, catalyst concentration, promoter or styrene concentration but which is effective even when such variables are maintained constant. In other words, our object is to provide a technique for producing a polystyrene of any desired intrinsic viscosity in the range of about 1 to 3 without necessarily altering optimum operating conditions of temperature, catalyst, promoter and monomer concentration. Other objects will be apparent as the detailed description of the invention proceeds.

We have discovered a method of controlling molecular weight or intrinsic viscosity of polystyrene which is produced by alkali metal solution polymerization in the presence of a promoter. Specifically, we have discovered that the intrinsic viscosity of polystyrene produced by said polymerization technique can be controlled within broad limits by effecting the polymerization in a solvent comprising a mixture of benzene and/or ethylbenzene together with toluene and/or xylene. By proper selection of the proportions of solvent components in the reaction mixture, styrene can be produced at monomer conversions as high as 85-100% having any desired intrinsic viscosity between those obtainable with either of the solvent components when used alone.

Polymerization of styrene in a hydrocarbon solution can be effected with about 0.01 to about 1.0 e.g. about 0.1 to about 0.2 weight percent based on styrene of finely dispersed sodium, preferably promoted by an amount in the range of 0.01 to 1.0, for example about 0.05 to about 0.5 weight percent of a promoter such as an ethylene glycol or polyethylene glycol diether, at a controlled pressure and at a temperature above 40° C. but below about 120° C. and usually below 80° C. Usual reaction periods are in the range of about 0.3 to about 3 hours. The polymerization is preferably effected batchwise, the sodium being introduced as a dispersion in the hydrocarbon solvent. The promoter, for example ethylene glycol dimethylether, diethylene glycol dimethylether, or the like, is usually employed in an amount of less than 1 mole per mole of sodium.

We have found that the particular hydrocarbon solvent employed in effecting such polymerization exerts a marked influence upon the extent of conversion of monomer to polystyrene and upon the intrinsic viscosity (molecular weight) of the polymer so produced.

Thus, a series of polymerization runs was conducted employing a 20% by weight solution of styrene in various aromatic hydrocarbon solvents. The reactions were carried out in a 1 liter glass flasks fitted with a reflux denser and connected to a manostate-controlled vacuum line. The feed was percolated through a column of 8–10 mesh alumina desiccant prior to its actual use in order to insure removal of water and other impurities. The catalyst was a 50 weight percent dispersion of sodium in solvent in the form of particles about 10 to 20 microns in size; the catalyst or initiator is usually prepared as a concentrated dispersion which can be diluted with xylene or other diluent prior to actual use. The promoter was diethylene glycol dimethylether which was redistilled from sodium prior to use. The promoter and sodium dispersion were mixed just prior to addition to the polymerization feed, the amount of sodium being 0.1 weight percent and the amount of promoter 0.1 weight percent (both based on the weight of styrene). Prior to addition of the catalyst, the pressure on the reaction flask, to which the styrene solution was charged, was reduced to a point which caused the reaction mixture to boil at the desired reaction temperature, which in this case was 60° C. After catalyst addition there was usually an induction period, followed by a period of vigorous reaction. After the run, an aliquot of the resulting polymer solution was diluted with benzene and precipitated by addition of methanol. Conversion and intrinsic viscosities were determined on the dried polymer, intrinsic viscosities being measured in benzene at 30° C. and expressed in deciliters per gram.

The effect of varying the solvent medium employed on the intrinsic viscosity and conversion to polystyrene is shown in Table I.

TABLE I

| Solvent | Conversion, percent | Intrinsic Viscosity |
|---|---|---|
| Pseudocumene | 1 | |
| Mesitylene | 2–20 | 0.11–0.16 |
| meta-xylene | 95 | 1.10 |
| Toluene | 95 | 1.47–1.59 |
| Ethylbenzene | 95 | 2.58–2.67 |
| Benzene | 99 | 2.71 |

As can be seen from the results tabulated above, benzene and ethylbenzene give polymer in high conversion having intrinsic viscosities above about 2.5 deciliters/gm. The use of meta-xylene and toluene, while giving similarly high conversion, results in a polymer having appreciably lower intrinsic viscosity. Trimethylbenzenes not only give extremely poor conversion (or none) but result in a polymer which is of extremely low molecular weight as evidenced by the intrinsic viscosity.

Desirably polystyrenes suitable for commercial applications such as injection molding, extrusion, vacuum forming and the like for the production of rigid plastic bodies have intrinsic viscosities in the range of from about 1.0 to about 3.0.

The objects of our invention are achieved by effecting the polymerization of styrene with dispersed sodium catalyst in a solvent comprising a mixture of about 10–90% of (a) benzene and/or ethylbenzene and about 90–10% of (b) toluene and/or xylene, the amount of each component of the solvent mixture being so selected as to obtain a product of any desired intrinsic viscosity within the range of about 1.0 to about 3.0. We have found that by polymerization of styrene in preselected mixtures of the indicated solvents, the product obtained by polymerization at any desired temperature and catalyst concentration can have any desired intrinsic viscosity within the indicated range without effecting any appreciable reduction in the degree of conversion obtained.

In order to demonstrate the effective control of intrinsic viscosity obtained by the present invention, a polymerization run was conducted in accordance with the procedure hereinbefore described. The solvent employed comprised a 20 weight percent solution of styrene in a solvent comprising equal parts by weight of benzene and meta-xylene. The solvent was distilled over sodium prior to use. The polymerization was carried out at 60° C., employing as before 0.1 weight percent of dispersed sodium and 0.1 weight percent diethylene glycol dimethylether (based on the weight of styrene). The results obtained are compared with runs employing the pure solvent components alone in Table II.

TABLE II

| Solvent | Conversion, percent | Intrinsic Viscosity |
|---|---|---|
| Meta-xylene | 95 | 1.10 |
| 50-50 Benzene-xylene | 86 | 1.70 |
| Benzene | 99 | 2.71 |

Similarly, other xylene isomers including the ortho isomer and para isomer, or mixtures of xylene isomers, when admixed with benzene, give polymer intrinsic viscosities intermediate between those of the individual solvent components when used alone.

The process of the present invention is particularly valuable in giving an added degree of control over the polymerization of styrene in solution with alkali metal catalysts. In certain instances, it may be desirable to adjust the solvent composition to effect an increase in the molecular weight of the polymer produced. In other instances, the opposite effect may be more desirable. For example, the polymerization of styrene with alkali metal catalysts is a highly exothermic reaction, necessitating the removal of large quantities of heat of reaction, and control of the reaction especially in large scale plant size reactors is exceedingly difficult. By adjusting the composition of the solvent medium employed in effecting polymerization, for example by addition of solvents which result in a polymer of lower molecular weight, the polymerization can be effected at lower temperatures at which the rate of reaction is slower and at which temperatures adequate removal of heat of reaction can be obtained by proper design of the reactor, condensers and associated equipment. The adjustment of the concentration of the various components in the solvent mixture can be employed to offset the increase in polymer molecular weight normally associated with a lowering of the polymerization temperature. This added degree of control is of utmost importance in assuring safe operation of plant-size equipment while producing polymer having the desired physical properties.

The process of the present invention is particularly valuable in effecting the polymerization of styrene contained in a solution thereof which is obtained as the effluent of a catalytic dehydrogenation process employing a feedstock comprising 10-40% ethylbenzene in a $C_8$ aromatic hydrocarbon stream as described and claimed in U.S. Patent 2,813,137 of W. W. Twaddle et al., patented November 12, 1957. The dehydrogenation effluent obtained in accordance with the teachings of said patent comprises a solution of about 20-30% styrene in a solvent comprising mainly xylenes together with lesser amounts of benzene, toluene and ethylbenzene. Such a solution upon treatment at 50-60° C. with about 0.1% dispersed sodium catalyst and a similar amount of diethylene glycol dimethylether promoter readily gives a polystyrene having an intrinsic viscosity of about 1.0 deciliters/gm. By incorporating in such solutions, prior to polymerization, additional quantities of benzene and/or ethylbenzene, sufficient to increase the concentration of benzene and/or ethylbenzene to above about 20% while maintaining the styrene content above about 10%, polymerization can be effected at the same desirable temperature and catalyst concentration to obtain a polymer having a substantially higher intrinsic viscosity. For example, a dehydrogenation effluent prepared in accordance with the teachings of the above U.S. patent has the typical composition shown in Table III. By addition of 20 parts benzene to this effluent, a styrene solution having the composition shown in the table is obtained, and can be polymerized in like manner to give a polymer of intrinsic viscosity in the range 1.5-2.0 deciliters/gm.

TABLE III

Polymerization of dehydrogenation effluent

| | Composition | |
|---|---|---|
| | Effluent | Effluent+ 20 Parts Benzene |
| Benzene | 3.1 | 19.2 |
| Toluene | 10.1 | 8.4 |
| Et. Benzene | 6.0 | 5.0 |
| O-Xylene | 16.0 | 13.3 |
| M-Xylene | 34.2 | 28.5 |
| P-Xylene | 8.5 | 7.1 |
| Styrene | 22.2 | 18.5 |
| | 100.0 | 100.0 |

From the foregoing it is apparent that the present invention provides a simple procedure for controlling the molecular weight of solution polymerized styrene employing a dispersed sodium catalyst.

While dispersed sodium has been described as the catalyst, it will be understood that other dispersed alkali metals or alloys of alkali metals may be used instead of, or in conjunction with, sodium, provided that they exhibit the required catalytic activity.

Similarly a variety of ether type compounds are effective as promoters in the polymerization described. Such compounds include dihydric alcohol-dialkylethers such as ethylene glycol dialkylether or polyethylene glycol dialkylethers. Although the alkyl groups in the dialkylether may each have from 1 to 4 carbon atoms, at least one of them is preferably a methyl group; diethylethers appear to be less satisfactory than dimethylethers. We prefer to employ an ethylene glycol dimethylether such as ethylene glycol dimethylether, diethylene glycol dimethylether and the like.

Styrene itself was polymerized in the foregoing examples, but it should be understood that other aromatic vinyl monomers such as alpha methylstyrene and the like may be used instead of or in admixture with styrene.

The polymeric styrenes produced as hereinabove described may be recovered from solution in the reaction solvent by methods known in the art. Thus, the polymer may be precipitated from solution by addition of a non-solvent therefore, e.g. methanol or the like or the solvent may be removed by distillation, steam stripping or heating under vacuum to obtain the polymer as solvent-free residue. Prior to recovery of the polymer, the polymer solution can be filtered and/or otherwise treated for removal of catalyst residues. Particularly effective means for recovering the desired polystyrene are more fully described in United States Patent 2,813,089 of W. W. Twaddle et al., patented November 12, 1957.

We claim:
1. In a process for preparing polystyrene by solution polymerization of styrene at a temperature between about 40° C. and about 80° C. in contact with from about 0.01 to about 0.5 weight percent of sodium and a promotional amount between 0.01 and 0.5 weight percent based on styrene of an ethylene glycol dimethylether in a solvent consisting essentially of $C_6$–$C_8$ aromatic hydrocarbons containing a major proportion of xylene isomers and not more than about 10% by weight total concentra- tion of benzene and ethylbenzene, the improvement which comprises adding a solvent selected from the group consisting of benzene and ethylbenzene in an amount sufficient to increase the total concentration of benzene and ethylbenzene in said solution to at least about 20% by weight while maintaining the styrene concentration in said solution above about 10%, and thereafter effecting said polymerization, whereby polystyrene of intrinsic viscosity above about 1.5 dl./gm., measured in benzene at 30° C. is produced.

2. The process of claim 1 wherein benzene is added to said solution and the concentration of benzene and ethylbenzene is at least about 25%.

References Cited in the file of this patent

UNITED STATES PATENTS

| | | |
|---|---|---|
| 2,327,082 | Walker | Aug. 17, 1943 |
| 2,813,089 | Twaddle et al. | Nov. 12, 1957 |
| 2,813,137 | Twaddle et al. | Nov. 12, 1957 |
| 2,851,502 | Bowman et al. | Sept. 9, 1958 |

OTHER REFERENCES

Mayo: J.A.C.S., pp. 2324–9, G5 (1943).